US008185535B2

(12) United States Patent
Pan et al.

(10) Patent No.: US 8,185,535 B2
(45) Date of Patent: May 22, 2012

(54) METHODS AND SYSTEMS FOR DETERMINING UNKNOWNS IN COLLABORATIVE FILTERING

(75) Inventors: Rong Pan, Mountain View, CA (US); Martin B. Scholz, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 274 days.

(21) Appl. No.: 12/609,327

(22) Filed: Oct. 30, 2009

(65) Prior Publication Data

US 2011/0106817 A1 May 5, 2011

(51) Int. Cl.
*G06F 7/00* (2006.01)
*G06F 17/30* (2006.01)
(52) U.S. Cl. .................................. 707/748; 705/347
(58) Field of Classification Search .................. None
See application file for complete search history.

(56) References Cited

U.S. PATENT DOCUMENTS

| | | | | |
|---|---|---|---|---|
| 5,262,941 | A * | 11/1993 | Saladin et al. | 705/38 |
| 6,839,680 | B1 | 1/2005 | Liu et al. | |
| 7,779,040 | B2 * | 8/2010 | Hicks | 707/795 |
| 7,827,052 | B2 * | 11/2010 | Scott et al. | 705/7.11 |
| 7,840,986 | B2 * | 11/2010 | Ali et al. | 725/105 |
| 2003/0101449 | A1 | 5/2003 | Bentolila et al. | |
| 2005/0204253 | A1 * | 9/2005 | Sukhobok et al. | 714/752 |
| 2007/0239638 | A1 * | 10/2007 | Zhuang et al. | 706/20 |
| 2008/0126176 | A1 | 5/2008 | Iguchi | |
| 2009/0199067 | A1 * | 8/2009 | Oh et al. | 714/752 |
| 2009/0328106 | A1 * | 12/2009 | Levitan | 725/46 |
| 2011/0112994 | A1 * | 5/2011 | Goto et al. | 706/12 |
| 2011/0208752 | A1 * | 8/2011 | Lidstrom et al. | 707/748 |

OTHER PUBLICATIONS

Fenstermacher et al.; "Mining Client-Side Activity for Personalization" Department of Management Information Systems, Eller College of Business and Public Administration, University of Arizona, Jun. 2002.
Baoyao, Zhou; "Intelligent Web Usage Mining" Nanyang Technological University, Division of Information Systems, School of Computer Engineering, 2004.
Baynote Inc.: "The Collective Intelligence Platform," Online, http://www.baynote.com/technology/platform/ 2010.
Hottolink Inc.; "Recognize" Online, http://www.hottolink.co.jp/english/reconize.html, 2009.
Andrejko et al.: "User Characteristics Acquisition from Logs with Semantics" 8. Slovak University of Technology in Bratislava.
Hongjun Lu et al: "Extending a Web Browser with Client-Side Mining," Hong Kong University of Science and Technology Department of Computer Science, Clear Water Bay, Kowloon, Hong Kong, China, 2003.

(Continued)

*Primary Examiner* — Khanh Pham
*Assistant Examiner* — Azam Cheema

(57) ABSTRACT

Embodiments of the present invention are directed to methods and systems for determining unknowns in rating matrices. In one embodiment, a method comprises forming a rating matrix, where each matrix element corresponds to a known favorable user rating associated with an item or an unknown user rating associated with an item. The method includes determining a weight matrix configured to assign a weight value to each of the unknown matrix elements, and sampling the rating matrix to generate an ensemble of training matrices. Weighted maximum-margin matrix factorization is applied to each training matrix to obtain corresponding sub-rating matrix, the weights based on the weight matrix. The sub-rating matrices are combined to obtain an approximate rating matrix that can be used to recommend items to users based on the rank ordering of the corresponding matrix elements.

20 Claims, 6 Drawing Sheets

OTHER PUBLICATIONS

Shankar et al.; "Personalized Web Search Based on Client Side Ontology", CS 498: B.Tech Project, 10. IIT Kanpur, India 2010.

Sendhikumar et al.; "Personalized ontology for web search personalization" 1. Anna University, Chennai, India , 2008.

Shahabi et al.; "Yoda an Accurate and Scalable Web based Recommendation System?" University of Southern California, Los Angeles, Sep. 2001.

Why Wubat? Website User Behavior & Analysis Tool, Wubat, Online, http://www.wubat.com/.

Claypool et al.; "Implicit Interest Indicators", 14. Worcester Polytechnic Institute, Worcester, Computer Science Department Worcester Polytechnic Institute Worcester, MA 01609, USA., 2001.

Shahabi et al.; "A Framework for Efficient and Anonymous Web Usage Mining Based on Client-Side Tracking," 15. University of Southern California, Los Angeles, 2002.

Chattertrap; Online http://www.chattertrap.com; Jul. 20, 2010.

HSNW: SRI defense technology spawns civilian application: published Jun. 29, 2010.

Anthony Ha: Facebook investor backs Chattertrap, a personal assistant for content, Jun. 28, 2010.

Pan, Rong et al., "One-Class Collaborative Filtering", HP Labs, Jul. 8, 2008.

SREBRO, Nathan et al., "Maximum-Margin Matrix Factorization".

Pan, Rong et al., "Mind the Gaps: Weighting the Unknown in Large-Scale One-Class Collaborative Filtering", HP Labs, 2009.

Rennie, Jason D. M., et al., "Fast Maximum Margin Matrix Factorization for Collaborative Prediction", Proceedings of the 22nd International Conference on Machine Learning, Bonn, Germany, 2005.

Weimer, Markus, et al., "Improving Maximum Margin Matrix Factorization".

* cited by examiner $$\bar{R} = \begin{bmatrix} ? & 1 & ? & ? & 1 & ? & & ? \\ 1 & ? & ? & ? & ? & 1 & & 1 \\ ? & ? & 1 & ? & 1 & ? & \cdots & ? \\ ? & 1 & ? & ? & ? & 1 & & 1 \\ 1 & ? & ? & 1 & ? & ? & & 1 \\ 1 & 1 & ? & ? & ? & 1 & & ? \\ & & \vdots & & & & \ddots & \\ 1 & ? & ? & ? & ? & 1 & & ? \end{bmatrix} = (R_{ij})_{m \times n}$$

with labels 102 and 104.

Figure 1

$$\bar{R} = \begin{bmatrix} -1 & 1 & -1 & -1 & 1 & -1 & & -1 \\ 1 & -1 & -1 & -1 & -1 & 1 & & 1 \\ -1 & -1 & 1 & -1 & 1 & -1 & \cdots & -1 \\ -1 & 1 & -1 & -1 & -1 & 1 & & 1 \\ 1 & -1 & -1 & 1 & -1 & -1 & & 1 \\ 1 & 1 & -1 & -1 & -1 & 1 & & -1 \\ & & \vdots & & & & \ddots & \\ 1 & -1 & -1 & -1 & -1 & 1 & & -1 \end{bmatrix} = (R_{ij})_{m \times n}$$

with labels 102 and 104.

Figure 2

$$\bar{W} = \begin{bmatrix} W_{11} & 1 & W_{13} & W_{14} & 1 & W_{16} & & W_{1n} \\ 1 & W_{22} & W_{23} & W_{24} & W_{25} & 1 & & 1 \\ W_{31} & W_{32} & 1 & W_{34} & 1 & W_{36} & \cdots & W_{3n} \\ W_{41} & 1 & W_{43} & W_{44} & W_{45} & 1 & & 1 \\ 1 & W_{52} & W_{53} & 1 & W_{55} & W_{56} & & 1 \\ 1 & 1 & W_{63} & W_{64} & W_{65} & 1 & & W_{6n} \\ & & & \vdots & & & \ddots & \\ 1 & W_{m2} & W_{m3} & W_{m4} & W_{m5} & 1 & & W_{mn} \end{bmatrix} = (W_{ij})_{m \times n}$$

$$\bar{P} = \begin{bmatrix} P_{11} & 1 & P_{13} & P_{14} & 1 & P_{16} & & P_{1n} \\ 1 & P_{22} & P_{23} & P_{24} & P_{25} & 1 & & 1 \\ P_{31} & P_{32} & 1 & P_{34} & 1 & P_{36} & \cdots & P_{3n} \\ P_{41} & 1 & P_{43} & P_{44} & P_{45} & 1 & & 1 \\ 1 & P_{52} & P_{53} & 1 & P_{55} & P_{56} & & 1 \\ 1 & 1 & P_{63} & P_{64} & P_{65} & 1 & & P_{6n} \\ & & & \vdots & & & \ddots & \\ 1 & P_{m2} & P_{m3} & P_{m4} & P_{m5} & 1 & & P_{mn} \end{bmatrix} = (P_{ij})_{m \times n}$$

Figure 6

METHODS AND SYSTEMS FOR DETERMINING UNKNOWNS IN COLLABORATIVE FILTERING

TECHNICAL FIELD

Embodiments of the present invention relate to collaborative filtering.

BACKGROUND

In recent years, personalized services have become increasingly indispensable to businesses that offer products for sale or rent over the Internet. Such businesses operate web sites that offer personalized recommendations to their customers. The quality of these recommendations can be important to the overall success of the business, because good recommendations can translate into increased sales and bad recommendation can annoy some customers and may even drive some customers away. Thus, determining which items to suggest to a particular customer is a non-trivial task with potentially far reaching implications. For example, a business may offer many items to choose from, and customer's are typically only willing to consider a small number of recommendations at a time before becoming annoyed, usually less than ten items.

One technique that has been adapted in recent years to address these issues is collaborative filtering, which aims at predicting personalized consumer preferences for particular items. Typically a recommendation is made to a customer based on the items previously rated by other customers who have purchased the same or similar items as the customer. For example, in a typical collaborative prediction system, the input to the system can be customer ratings on items the customers have already purchased. Predicting customer preferences for items the customers have not purchased or seen are based on observed patterns of the customer or patterns observed for customers who have purchased similar items. However, in many more situations, rating an on-line customer's interest in most products offered for sale is unknown and cannot be accurately determined by the customer's behavior. For example, a customer may be presented with a number of items, but the customer's failure to click on a link to view an item can be interpreted as the customer's negative impression of the item or for some other reason not related to the customer's negative impression of the item.

Thus, businesses that offer products for sale over the Internet continue to seek enhancements in determining which items to offer to particular customers.

BRIEF DESCRIPTION OF THE DRAWINGS

FIG. 1 shows an example of a rating matrix with in unknown matrix elements in accordance with embodiments of the present invention.

FIG. 2 shows an example of a rating matrix with "−1's" replacing unknowns matrix elements in accordance with embodiments of the present invention.

FIG. 5 shows an example of a sampling probability matrix organized in accordance with embodiments of the present invention.

FIG. 6 shows an example of sampling a rating matrix in accordance with embodiments of the present invention.

DETAILED DESCRIPTION

Figures 3, 4:
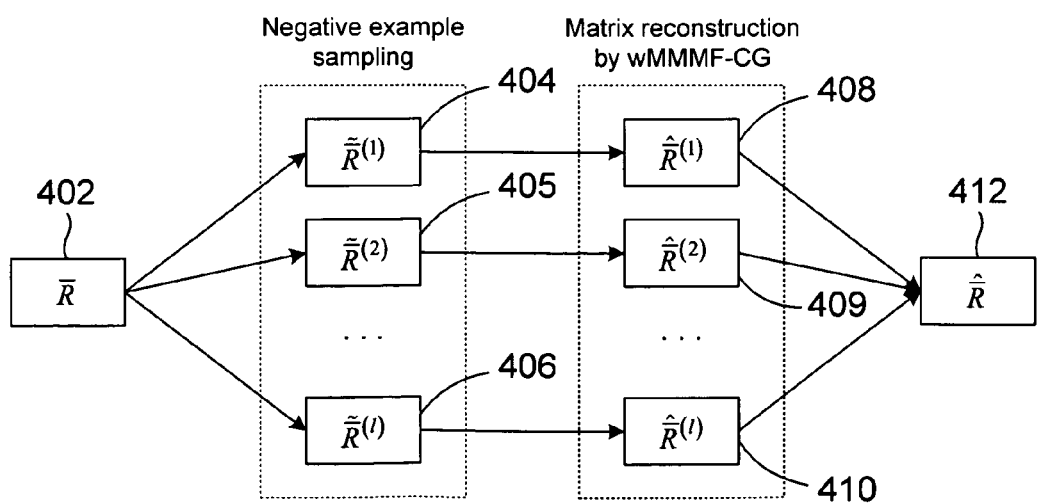
FIG. 3 shows an example of a weight matrix organized in accordance with embodiments of the present invention.
FIG. 4 shows a diagram of an ensemble based method for determining an approximate rating matrix in accordance with embodiments of the present invention.

Various embodiments of the present invention are directed to methods and systems for determining unknowns in rating matrices. In the following description capitals letters such as $\overline{A}$ denote matrices, $A_{ij}$ represents an element in the ith row and jth column of the matrix $\overline{A}$, $A_{i\cdot}$ denotes the ith row of $\overline{A}$, and $A_{\cdot j}$ denotes the jth column of $\overline{A}$, and $\overline{A}^T$ denotes the transpose of $\overline{A}$.

Consider a hypothetical business with a database composed of a structured collection of records or data regarding user information and user ratings of items offered for sale or viewing by the business. The records can be stored in a computer-readable medium and can be processed by a computing device. In particular, suppose the database contains a record of m users, n items sold or offered for viewing, and previous rating or viewing information associated with the items and users. The data can be represented by a rating matrix, denoted by $\overline{R}$. The elements of $\overline{R}$ take the value "1" for items with a favorable user rating, also called positive examples, or the elements of $\overline{R}$ are identified as unknown, which indicates an unknown missing positive example or an unknown unfavorable user rating called a "negative example." FIG. 1 shows an example of a rating matrix $\overline{R}$ organized in accordance with embodiments of the present invention. Each row of the rating matrix $\overline{R}$ represents one of the m users, and each column represents one of the n items. As shown in the example of FIG. 1, the matrix elements are represented by a "1" or a "?." For example, a matrix element $R_{35}$ 102 is assigned the value "1" which corresponds to the $3^{rd}$ user having a favorable rating for the $5^{th}$ item, and a matrix element $R_{43}$ 104 is unknown which corresponds to the $4^{th}$ user having a missing positive rating for the $3^{rd}$ item or having an unknown unfavorable view of the $3^{rd}$ item.

Methods and systems of the present invention are directed to generating an approximate rating matrix $\hat{\overline{R}}$ that includes the original positive examples of the rating matrix $\overline{R}$ and predicts positive examples among the unknown matrix elements of the rating matrix $\overline{R}$ using a modified version of one-class collaborative filtering ("OCCF").

Mathematical Formulation

Given a rating matrix $\overline{R}=(R_{ij})_{m\times n}$ that characterizes a database as described above and a corresponding non-negative weight matrix $\overline{W}=(W_{ij})_{m\times n} \in \mathbb{R}_+^{m\times n}$, a weighted low-rank rating matrix $\hat{\overline{R}}$ that approximates $\overline{R}$ can be determined by minimizing an objective function of a weighted hinge loss and trace norm of $\hat{\overline{R}}$ as follows:

$$\mathcal{L}(\hat{\overline{R}}) = \sum_{i,j}^{m,n} W_{ij} h(R_{ij}, \hat{R}_{ij}) + \lambda \|\hat{\overline{R}}\|_{\Sigma}$$

where $h(\cdot)$ is a hinge loss function,

λ is a regularization parameter; and $\|\cdot\|_\Sigma$ is the trace norm.

An unweighted hinge loss function was proposed in the paper "Maximum-Margin Matrix Factorization," Nathan Srebro, Jason D. M. Rennie, Tommi Jaakkola: *Advances in Neural Information Processing Systems (NIPS)*, 2004. Embodiments of the present invention use a modified objective function in which weights $W_{ij}$ are included to reflect the contribution of minimizing the element-wise losses each $R_{ij}$ contributes to the overall objective function $\mathcal{L}(\bar{R})$.

In OCCF, the rating matrix elements $R_{ij}$ corresponding to positive examples are assigned the value "1," as described above with reference to FIG. 1. On the other hand, for missing values, methods of the present invention are formulated with the assumption that most of the matrix elements corresponding to missing information are negative examples. In other words, missing values in the rating matrix $\bar{R}$ are replaced by the value "−1." FIG. 2 shows the example rating matrix $\bar{R}$, shown in FIG. 1, with "−1's" replacing unknowns identified by "?" in accordance with embodiments of the present invention. For example, the matrix element $R_{35}$ 102 remains unchanged, but the unknown matrix element $R_{43}$ 104, identified in FIG. 1 with "?," is replaced with the value "−1." Because the rating information corresponding to positive examples is obtained with high confidence the corresponding weights in the weighting matrix $\overline{W}$ are assigned the value "1." In contrast, the weights $W_{ij}$ associated with negative elements of the rating matrix $\bar{R}$ (i.e., $R_{ij}=-1$) lie within the interval [0,1].

FIG. 3 shows an example of a weight matrix $\overline{W}$ associated with the example rating matrix $\bar{R}$ organized in accordance with embodiments of the present invention. As shown in the example of FIG. 3, the weight matrix $\overline{W}$ is an m by n matrix with matrix elements corresponding the elements of the rating matrix $\bar{R}$. For example, as described above, the matrix element $R_{35}$ 102 represents a positive example and has a matrix element value of "1," and the corresponding weight matrix element $W_{35}$ 302 also has a matrix element value of "1." On the other hand, the matrix element $R_{43}$ 104 represents an unknown or negative example, and the corresponding weight matrix element $W_{43}$ 304 has a matrix value $W_{43} \in [0,1]$.

For unknown matrix elements, methods of the present invention assume that it is likely that most of the unknown matrix elements are negative examples. For example, in social bookmarking, a user has very few web pages and tags, and for news recommendations, a user does not read most of the news. However, the confidence of missing values being negative is not as high as the confidence of non-missing values being positive. As a result, lower weights are given to the negative examples. Embodiments of the present invention include a variety of different types of weighting schemes that can be used to construct the elements of the weight matrix $\overline{W}$. In certain embodiments, a uniform weighting scheme assumes unknown matrix elements are negative examples with equal probability over all users or all items. In other words, for a uniform weighting scheme, the weight $W_{ij}$ for all unknown elements is $\delta \in [0,1]$. In other embodiments, a user-oriented weighting scheme assumes that if a user has more positive examples than negative examples, it is more likely that the user does not like the other items. In other words, the unknown matrix elements with this type of user is assumed to be negative with a higher probability. In still other embodiments, an item-oriented weighting scheme assumes that if an item has relatively fewer positive examples than other items, the unknown matrix elements for this item is negative with higher probability. Table I summarize three different examples of simple weighting schemes that can be used as weights in the weight matrix $\overline{W}$:

TABLE I

|  | Positive examples | "Negative" examples |
| --- | --- | --- |
| Uniform | $W_{ij} = 1$ | $W_{ij} = \delta$ |
| User-oriented | $W_{ij} = 1$ | $W_{ij} \propto \Sigma_j R_{ij}$ |
| Item-oriented | $W_{ij} = 1$ | $W_{ij} \propto m - \Sigma_j R_{ij}$ |

Embodiments of the present invention are not limited to the three weighting schemes described above. Embodiments of the present invention include other suitable weighting schemes.

For each matrix $\bar{R}$ that approximates the rating matrix $\bar{R}$, the objective function $\mathcal{L}(\bar{R})$ can be computed based on any decomposition of $\bar{R}$ into $\bar{R}=\bar{U}\bar{V}^T$ where $\bar{U} \in \mathbb{R}^{m \times d}$ and $\bar{V} \in \mathbb{R}^{n \times d}$. Note that usually the number of $d<<r$ where $r \approx \min(m,n)$ is the rank of the matrix $\bar{R}$. To this end, the object function can be rewritten as follows:

$$\mathcal{L}(\bar{U}, \bar{V}) = \sum_{i,j}^{m,n} W_{ij}\left(h(R_{ij}, \bar{U}_{i\cdot}\bar{V}_{\cdot j}^T) + \frac{1}{2}\lambda(\|\bar{U}_{i\cdot}\|_F^2 + \|\bar{V}_{\cdot j}\|_F^2)\right)$$

where $\|\cdot\|_F^2$ is the Frobenius norm. For the non-weighted objective function, a number of different ways of optimizing a hinge loss objective function with trace norm regularization is discussed in "Fast Maximum Margin Matrix Factorization for Collaborative Prediction," by Jason D. M. Rennie and Nathan Srebro, *Proceedings of the International Conference on Machine Learning (ICML '05), ACM*, 2005. One strategy for optimizing the objective function $\mathcal{L}(\bar{R})$ is the well-known conjugate gradient method. Taking partial derivatives of $\mathcal{L}$ with respect to each entry of $\bar{U}$ and $\bar{V}$ gives:

$$\frac{\partial \mathcal{L}(\bar{U}, \bar{V})}{\partial \bar{U}_{ik}} = \sum_{j}^{n} W_{ij}h(R_{ij}, \bar{U}_{i\cdot}\bar{V}_{\cdot j}^T)V_{jk} + \lambda\left(\sum_{j}^{n} W_{ij}\right)U_{ik}$$

for every i in $1 \leq i \leq m$ and k in $1 \leq k \leq d$. Thus, in one method and system embodiment of the present invention, weighted maximum-margin matrix factorization with conjugate gradients algorithm ("wMMMF-CG") can be applied to solve the optimization problem min $\mathcal{L}(\bar{U},\bar{V})$.

Note that running time for wMMMF with CG is O(m×n), which may be intractable in large-scale collaborative filtering problems. Method embodiments of the present invention use an ensemble based algorithm to solve the optimization problem min $\mathcal{L}(\bar{U},\bar{V})$.

Methods and Systems for Approximating the Rating Matrix

For OCCF, a naïve assumption is to assume that unknown matrix elements of the rating matrix are negative examples. However, one main drawback with such an assumption is that the computational costs are high when the size of the rating matrix $\bar{R}$ is large, with wMMMF having the same issue. In addition, it may raise problems related to class imbalance: There are significantly fewer "1" matrix elements than there are "−1" matrix elements, which might adversely affect the predictive performance of the employed collaborative filtering technique.

In this subsection, a stochastic method for determining the approximate rating matrix $\bar{\bar{R}}$ based on negative example sampling for OCCF is now described. FIG. 4 shows a diagram of an ensemble based method for determining the approximate rating matrix $\bar{\bar{R}}$ in accordance with embodiments of the present invention. In phase I, negative matrix elements of the rating matrix $\bar{R}$ are sampled as follows. Based on an assumed sampling probability matrix $\bar{P}$ described is greater detail below, l training matrices $\bar{\bar{R}}^{(i)}$ 404-406 are determined. Each training matrix $\bar{\bar{R}}^{(i)}$ includes the positive examples of $\bar{R}$ and a sampled portion of the negative examples of $\bar{R}$ as determined by $\bar{P}$ and a sample size q. The integers l and q are determined by a method and system operator. In phase II, for each training matrix $\bar{\bar{R}}^{(i)}$, a sub-rating matrix $\hat{\bar{R}}^{(i)}$ is determined by applying wMMMF-CG to the corresponding training matrix $\bar{\bar{R}}^{(i)}$. For example, as shown in FIG. 4, sub-rating matrices 408-410 are determined by applying wMMMF-CG to each of the training matrices 404-406, respectively. Finally, all of the sub-rating matrices $\hat{\bar{R}}^{(i)}$ are combined with equal weights to obtain approximate rating matrix $\bar{\bar{R}}$ 412.

Because OCCF is a class imbalanced problem, where positive examples are sparse in the rating matrix $\bar{R}$, the positive examples are transferred to each of the training matrices $\bar{\bar{R}}^{(i)}$. In other words, the positive examples each have a probability of "1" of being selected for each of the training matrices $\bar{\bar{R}}^{(i)}$. On the other hand, the negative examples of $\bar{R}$ are sampled from the unknown matrix elements based on the sampling probability matrix $\bar{P}$ and the sample size q. In other words, the negative examples each have a probability in the interval [0,1] of being selected for a training matrix.

FIG. 5 shows an example of a sampling probability matrix $\bar{P}$ organized in accordance with embodiments of the present invention. The example sampling probability matrix $\bar{P}$ corresponds to the rating matrix $\bar{R}$ shown in FIG. 2. Matrix elements of $\bar{P}$ corresponding to positive example elements of $\bar{R}$ are assigned the probability "1." For example, matrix element $R_{35}$ 102, shown in FIG. 2, is a positive example with value "1" and the corresponding matrix element $P_{35}$ 502 is assigned the value "1." On the other hand, matrix element $R_{43}$ 104, shown in FIG. 2, is assumed to be a negative example with assigned value "−1." The corresponding matrix element $P_{43}$ in the sampling probability matrix $\bar{P}$ represents a probability value in the interval [0,1].

The sampling schemes used to assign probabilities $P_{ij}$ to the matrix elements of the sampling probability matrix $\bar{P}$ correspond to the weighting schemes used to assign weights $W_{ij}$ of the weight matrix $\bar{W}$. In certain embodiments, for uniform random sampling of the rating matrix $\bar{R}$, all the unknown matrix elements are assumed to share the same probability of being sampled as a negative example with $P_{ij} \propto 1$. In other embodiments, for user-oriented sampling, if a user has viewed more items, those items the user has not viewed may be negative examples with high probability given by:

$$P_{ij} \propto \sum_{i}^{m} I[R_{ij} = 1]$$

where I is a count of the number of $R_{ij}$'s equal to "1" in the ith row. In other embodiments, for item-oriented sampling, if an item is viewed by few users, those users that have not viewed the item will likely not view the item either. The unknown matrix elements for this item are negative with probability given by:

$$P_{ij} \propto \frac{1}{\sum_{j}^{n} I[R_{ij} = 1]}$$

Embodiments of the present invention are not limited to the three sampling probability schemes described above. Embodiments of the present invention include other kinds of sampling probability schemes.

FIG. 6 shows an example of sampling performed on the rating matrix $\bar{R}$, shown in FIG. 2, in accordance with embodiments of the present invention. In the example of FIG. 6, an intermediate matrix denoted by $\bar{R}^{(i)}$ is constructed by selecting all of the positive examples and q negative examples of the rating matrix $\bar{R}$. Unselected negative examples are assigned the value "0." For example, matrix elements 602 and 604 correspond to negative examples and are part of the q randomly selected negative examples of the rating matrix $\bar{R}$. By contrast, matrix elements 606 and 608 of rating matrix $\bar{R}$ are not part of the q randomly selected negative examples. Thus, corresponding "0's" appear in place of "−1's" in the matrix elements 606 and 608 of the intermediate matrix $\bar{R}^{(i)}$. Taking into account the sampling probabilities of a sampling probability matrix $\bar{P}$, the probability $P_{14}$ associated with the negative example of the matrix element 604 is high, so its value will likely be retained in the training matrix $\bar{\bar{R}}^{(i)}$. By contrast, the probability $P_{25}$ associated with the negative example of the matrix element 602 is low, so it is not likely to get be selected for the training matrix $\bar{\bar{R}}^{(i)}$. Thus, in this example, it is given the value "0" instead.

Once the training matrices $\bar{\bar{R}}^{(1)}, \bar{\bar{R}}^{(2)}, \ldots, \bar{\bar{R}}^{(l)}$ have been determined, each training matrix is processed using wMMMF with CG, as described above with reference to FIG. 4, in order to obtain corresponding sub-rating matrices $\hat{\bar{R}}^{(1)}, \hat{\bar{R}}^{(2)}, \ldots, \hat{\bar{R}}^{(l)}$. The approximate rating matrix $\hat{\bar{R}}$ can be determined by taking an unweighted average of the sub-rating matrices $\hat{\bar{R}}^{(1)}, \hat{\bar{R}}^{(2)}, \ldots, \hat{\bar{R}}^{(l)}$ as follows:

$$\hat{\bar{R}} = \frac{1}{l} \sum_{i=1}^{l} \hat{\bar{R}}^{(i)}$$

The approximate rating matrix $\hat{\bar{R}}$ is applied by rank ordering the items for each user based on the numerical value of the corresponding matrix elements in $\hat{\bar{R}}$. Consider a user represented by a row i in the approximate rating matrix $\hat{\bar{R}}$, and suppose k of the n items (i.e., k<n) can be recommended for purchasing to the $i^{th}$ user. Items for the $i^{th}$ user are rank ordered according to the value of the corresponding matrix elements in the $i^{th}$ row of $\hat{\bar{R}}$. For example, items can be rank ordered by correspondingly ordering the matrix elements in the $i^{th}$ row in decreasing order from largest to smallest. As a result, items with the largest positive matrix elements correspondingly receive high rankings and items with the smallest or negative corresponding matrix elements receive corresponding lower rankings. The k items recommended to the $i^{th}$ user correspond to the k largest matrix elements in the $i^{th}$ row of the approximate rating matrix $\hat{\bar{R}}$.

Figure 7:
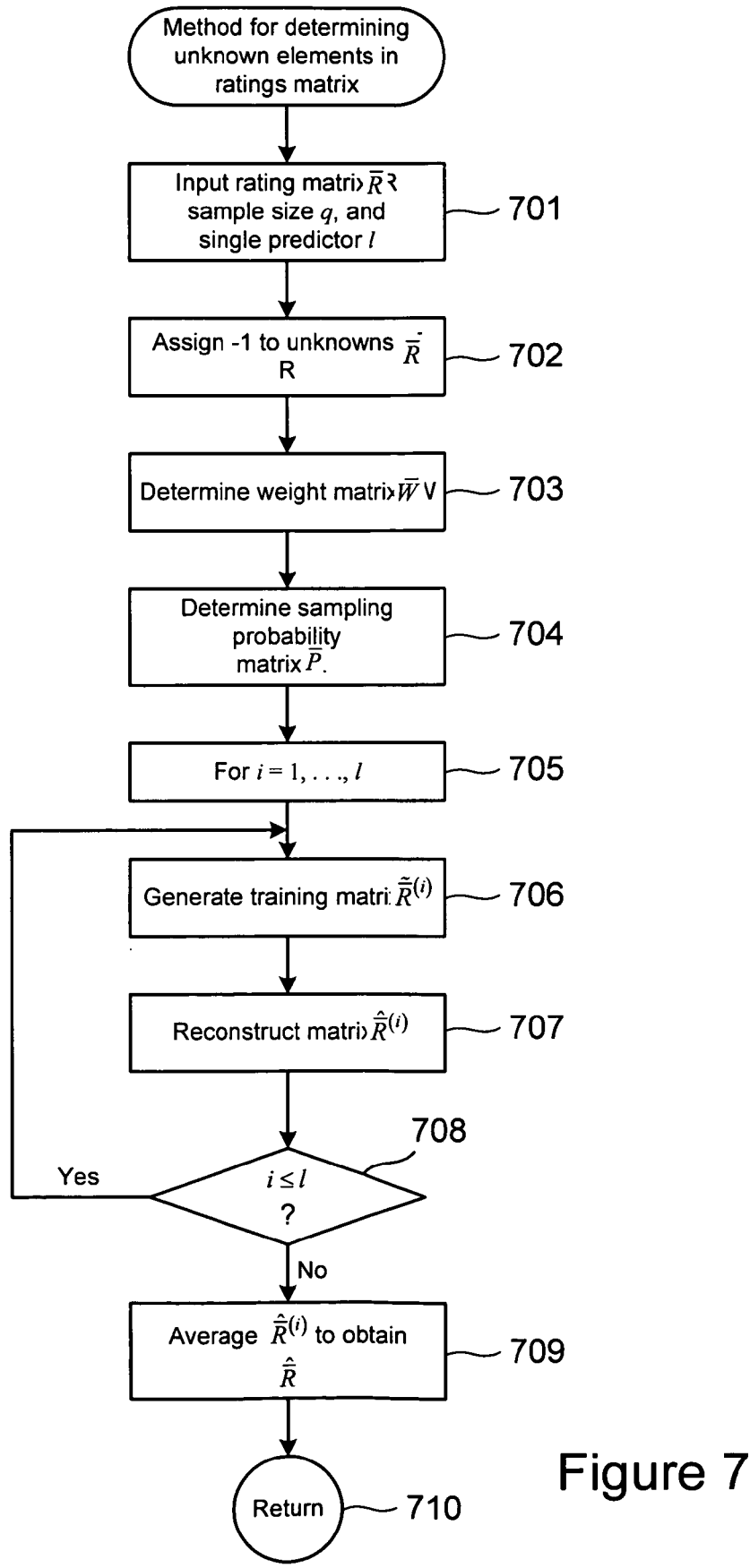
FIG. 7 shows a control-flow diagram of a method for determining unknown elements in a rating matrix in accordance with embodiments of the present invention.

FIG. 7 shows a control-flow diagram of a method for determining unknown elements in a rating matrix in accordance with embodiments of the preset invention. In step 701, a sample size q, a single predictor l, and a rating matrix $\overline{R}$, such as the rating matrix described above with reference to FIG. 1, are input. In step 702, unknown matrix elements of the rating matrix $\overline{R}$ are assumed to be negative examples and are assigned the value "−1," as described above with reference to FIG. 2. In step 703, a weight matrix $\overline{W}$ is determined as described above with reference to FIG. 3. The weights can be determined according to a number of different weighting schemes, such as the uniform weighting scheme, the user-oriented weighting scheme, and the item-oriented weighting scheme, described above with reference to Table I. In step 704, a sampling probability matrix $\overline{P}$ is determined as described above with reference to FIG. 5. The probabilities can be determined according to a number of different sampling schemes, such as uniform random sampling, the user-oriented sampling, and the item-oriented sampling can be used described above. In the for-loop beginning with step 705, steps 706 and 707 are repeated. In step 706, training matrices $\overline{R}^{(i)}$ are determined as described above with reference to FIG. 6. In step 707, a sub-matrix $\widetilde{R}^{(i)}$ is reconstructed from the training matrix $\overline{R}^{(i)}$ using wMMMF with CG. In step 708, when i is less than or equal to l, steps 706 and 707 are repeated, otherwise, the method proceeds to step 709. In step 709, the sub-matrices $\widetilde{R}^{(i)}$ are averaged to obtain the approximate rating matrix $\widetilde{R}$. In step 710, the approximate rating matrix $\widetilde{R}$ is returned.

Figure 8:
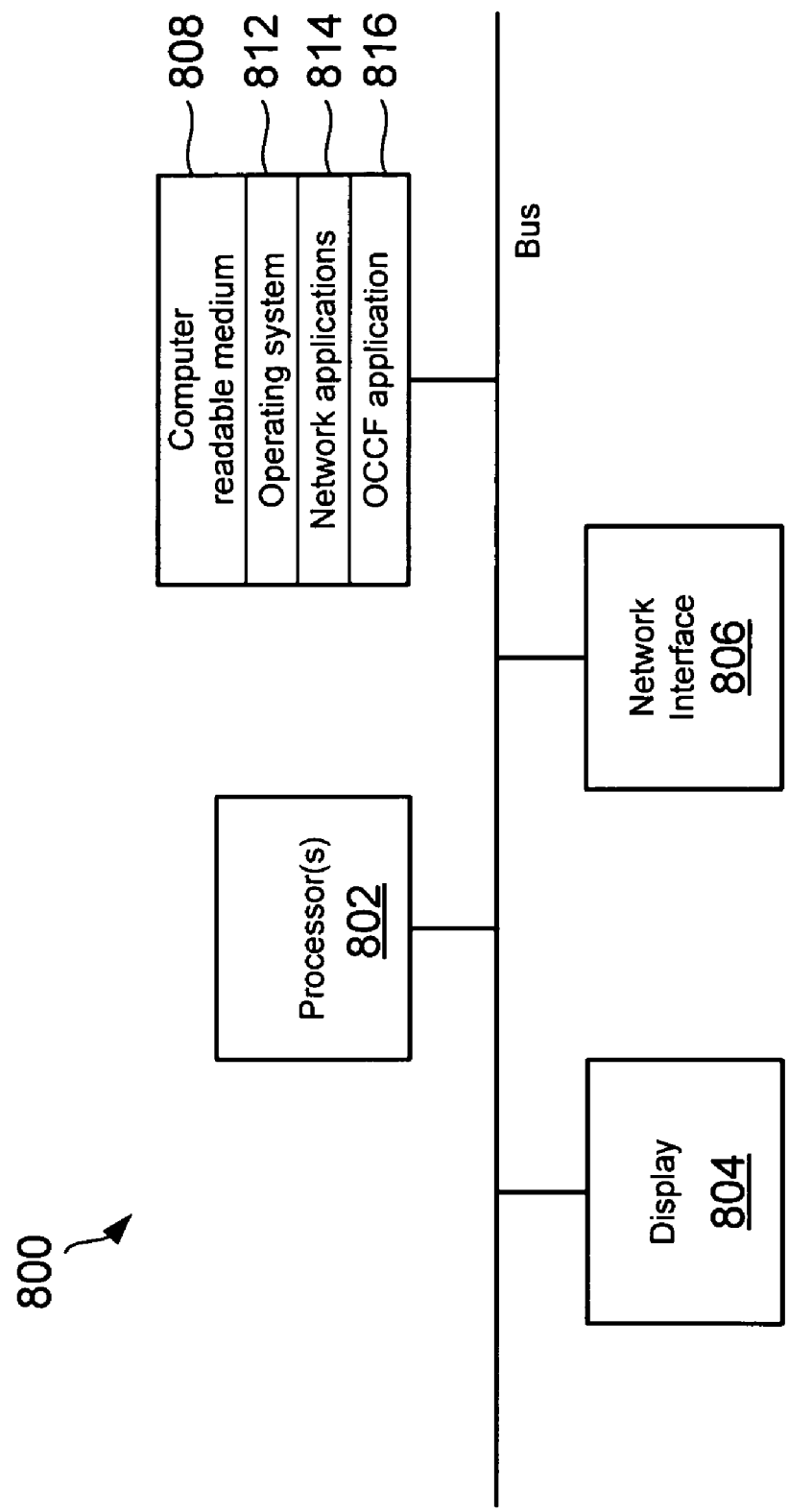
FIG. 8 shows a schematic representation of a computing device configured in accordance with embodiments of the present invention.

The methods described above to generate unknowns in a rating matrix can be implemented on a computing device, such as a desktop computer, a laptop, or any other suitable device configured to carrying out the processing steps of a computer program. FIG. 8 shows a schematic representation of a computing device 800 configured in accordance with embodiments of the present invention. The device 800 may include one or more processors 802, such as a central processing unit; one or more display devices 804, such as a monitor; one or more network interfaces 806, such as a Local Area Network LAN, a wireless 802.11x LAN, a 3G mobile WAN or a WiMax WAN; and one or more computer-readable mediums 808. Each of these components is operatively coupled to one or more buses 810. For example, the bus 810 can be an EISA, a PCI, a USB, a FireWire, a NuBus, or a PDS.

The computer readable medium 808 can be any suitable medium that participates in providing instructions to the processor 802 for execution. For example, the computer readable medium 808 can be non-volatile media, such as firmware, an optical disk, a magnetic disk, or a magnetic disk drive; volatile media, such as memory; and transmission media, such as coaxial cables, copper wire, and fiber optics. The computer readable medium 808 can also store other software applications, including word processors, browsers, email, Instant Messaging, media players, and telephony software.

The computer-readable medium 808 may also store an operating system 812, such as Mac OS, MS Windows, Unix, or Linux; network applications 814; and an OCCF application 816. The operating system 814 can be multi-user, multi-processing, multitasking, multithreading, real-time and the like. The operating system 814 can also perform basic tasks such as recognizing input from input devices, such as a keyboard, a keypad, or a mouse; sending output to the display 804 and the printer 806; keeping track of files and directories on medium 810; controlling peripheral devices, such as disk drives, printers, image capture device; and managing traffic on the one or more buses 812. The network applications 814 includes various components for establishing and maintaining network connections, such as software for implementing communication protocols including TCP/IP, HTTP, Ethernet, USB, and FireWire.

The OCCF application 816 provides various software components for generating unknown matrix elements in a rating matrix, as described above. In certain embodiments, some or all of the processes performed by the application 816 can be integrated into the operating system 812. In certain embodiments, the processes can be at least partially implemented in digital electronic circuitry, or in computer hardware, firmware, software, or in any combination thereof.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method for determining unknowns in a rating matrix using a computing device, the method comprising:
    forming a rating matrix, wherein each matrix element corresponds to a known favorable user rating of an item or an unknown user rating of an item;
    determining a weight matrix configured to assign a weight value to each of the unknown user ratings;
    sampling the rating matrix to generate an ensemble of training matrices;
    applying weighted maximum-margin matrix factorization based on the weight matrix to each training matrix to obtain corresponding sub-rating matrices; and
    combining the sub-rating matrices to obtain an approximate rating matrix that can be used to recommend items to each user based on a rank ordering of the matrix elements associated with each user.

2. The method of claim 1 wherein the favorable user rating of an item further comprises assigning a value "1" to each corresponding matrix element.

3. The method of claim 1 wherein the unknown user rating of an item further comprises assigning a value "−1" to each corresponding matrix element.

4. The method of claim 1 wherein determining a weight matrix further comprises applying a uniform weighting scheme that assumes the unknown user ratings are negative with equal probability.

5. The method of claim 1 wherein determining a weight matrix further comprises applying a user-oriented weighting scheme that assumes for each user with more favorable user ratings than unknown user ratings, the unknown user ratings of items associated with the same user are unfavorable with higher probability.

6. The method of claim 1 wherein determining a weight matrix further comprises applying an item-oriented weighting scheme that assumes when an item has relatively fewer favorable user ratings than other items, the unknown user ratings for the same item are negative with higher probability.

7. The method of claim 1 wherein sampling the rating matrix further comprises:
  sampling the rating matrix based on a sampling probability matrix and a sample size; and
  retaining positive valued matrix elements of the rating matrix in each of the training matrices.

8. The method of claim 1 wherein applying weighted maximum-margin matrix factorization to each training matrix further comprises applying a conjugate gradient method to equations produced by the weight maximum-margin matrix factorization.

9. The method of claim 1 wherein combining the sub-rating matrices to obtain an approximate rating matrix further comprises averaging the sub-rating matrices.

10. The method of claim 1 further comprising:
  rank ordering items associated with each user based on rank order from largest to smallest of the corresponding matrix elements of the approximate rating matrix; and
  selecting one or more items for recommending to the user based on the rank order of the corresponding matrix elements.

11. A non-transitory computer-readable storage medium having instructions encoded therein for enabling a processor to perform the operations of:
  forming a rating matrix, wherein each matrix element corresponds to a known favorable user rating of an item or an unknown user rating of an item;
  determining a weight matrix configured to assign a weight value to each of the unknown user ratings;
  sampling the rating matrix to generate an ensemble of training matrices;
  applying weighted maximum-margin matrix factorization based on the weight matrix to each training matrix to obtain corresponding sub-rating matrices; and
  combining the sub-rating matrices to obtain an approximate rating matrix that can be used to recommend items to each user based on a rank ordering of the matrix elements associated with each user.

12. The non-transitory computer-readable storage medium of claim 11 wherein the favorable user rating of an item further comprises assigning a value "1" to each corresponding matrix element.

13. The non-transitory computer-readable storage medium of claim 11 wherein the unknown user rating of an item further comprises assigning a value "−1" to each corresponding matrix element.

14. The non-transitory computer-readable storage medium of claim 11 wherein determining a weight matrix further comprises applying a uniform weighting scheme that assumes the unknown user ratings are negative with equal probability.

15. The non-transitory computer-readable storage medium of claim 11 wherein determining a weight matrix further comprises applying a user-oriented weighting scheme that assumes for each user with more favorable user ratings than unknown user ratings, the unknown ratings of items associated with the same user are unfavorable with higher probability.

16. The non-transitory computer-readable storage medium of claim 11 wherein determining a weight matrix further comprises applying an item-oriented weighting scheme that assumes when an item has relatively fewer favorable user ratings than other items, the unknown user ratings for the same item are negative with higher probability.

17. The non-transitory computer-readable storage medium of claim 11 wherein sampling the rating matrix further comprises:
  sampling the rating matrix based on a sampling probability matrix and a sample size; and
  retaining positive valued matrix elements of the rating matrix in each of the training matrices.

18. The non-transitory computer-readable storage medium of claim 11 wherein applying weighted maximum-margin matrix factorization to each training matrix further comprises applying a conjugate gradient method to equations produced by the weight maximum-margin matrix factorization.

19. The non-transitory computer-readable storage medium of claim 11 wherein combining the sub-rating matrices to obtain an approximate rating matrix further comprises averaging the sub-rating matrices.

20. The non-transitory computer-readable storage medium of claim 11 further comprising:
  rank ordering items associated with each user based on rank order from largest to smallest of the corresponding matrix elements of the approximate rating matrix; and
  selecting one or more items for recommending to the user based on the rank order of the corresponding matrix elements.

* * * * *